(12) United States Patent
Makino et al.

(10) Patent No.: US 8,749,751 B2
(45) Date of Patent: Jun. 10, 2014

(54) METHOD FOR PRODUCING LIQUID CRYSTAL DISPLAY PANEL, AND LIQUID CRYSTAL DISPLAY PANEL

(75) Inventors: Hiroki Makino, Osaka (JP); Takatoshi Kira, Osaka (JP); Mitsuaki Morimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 159 days.

(21) Appl. No.: 13/497,780

(22) PCT Filed: Aug. 5, 2010

(86) PCT No.: PCT/JP2010/063263
§ 371 (c)(1),
(2), (4) Date: May 23, 2012

(87) PCT Pub. No.: WO2011/040117
PCT Pub. Date: Apr. 7, 2011

(65) Prior Publication Data
US 2012/0224133 A1      Sep. 6, 2012

(30) Foreign Application Priority Data
Oct. 2, 2009   (JP) ................. 2009-230182

(51) Int. Cl.
*G02F 1/1341*   (2006.01)
(52) U.S. Cl.
USPC .......................... 349/187; 349/190
(58) Field of Classification Search
USPC ................................. 349/187, 190
See application file for complete search history.

(56) References Cited

U.S. PATENT DOCUMENTS

| | | | |
|---|---|---|---|
| 2003/0151717 A1* | 8/2003 | Shin | 349/158 |
| 2009/0002619 A1* | 1/2009 | Kanai et al. | 349/129 |
| 2009/0128761 A1* | 5/2009 | Tamatani et al. | 349/122 |

FOREIGN PATENT DOCUMENTS

| | | | |
|---|---|---|---|
| JP | 4-116619 A | 4/1992 | |
| JP | 2007-298747 A | 11/2007 | |
| JP | 2008-145724 A | 6/2008 | |
| JP | 2008-176204 a | 7/2008 | |
| WO | WO 2008099988 A1 * | 8/2008 | G02F 1/13 |

OTHER PUBLICATIONS

International Search Report received for PCT Patent Application No. PCT/JP2010/063283, mailed on Nov. 9; 2010, 3 pages (1 page of English translation and 2 pages of PCT Search Report).

* cited by examiner

*Primary Examiner* — Bumsuk Won
*Assistant Examiner* — Edmond Lau
(74) *Attorney, Agent, or Firm* — Morrison & Foerster LLP

(57) ABSTRACT

To provide a method for producing liquid crystal display panels from a panel assembly, the display panels having a panel thickness smaller than that of the assembly, by which favorable scribe grooves can be formed, which therefore allows contribution to thin profiles and narrow frame regions of the display panels. The method includes a first scribe-formation step of forming, after a first step of thinning a TFT substrate assembly 20A and a CF substrate assembly 30A of a panel assembly 10A by etching, first scribe grooves 20*b* on an outer surface 20*a* of the TFT substrate assembly 20A along regions where seals 40 are disposed, and a second thinning step of further thinning the substrate assemblies 20A and 30A by etching, and developing the first scribe grooves 20*b* formed on the outer surface 20*a* to expose portions of the seals 40 at bottoms of the first scribe grooves 20*b*.

7 Claims, 14 Drawing Sheets

METHOD FOR PRODUCING LIQUID CRYSTAL DISPLAY PANEL, AND LIQUID CRYSTAL DISPLAY PANEL

CROSS REFERENCE TO RELATED APPLICATIONS

This is a U.S. National Phase patent application of PCT/JP2010/063263, filed Aug. 5, 2010, which claims priority to Japanese Patent Application No. 2009-230182, filed Oct. 2, 2009, each of which is hereby incorporated by reference in the present disclosure in its entirety.

TECHNICAL FIELD

The present invention relates to a method for producing a liquid crystal display panel, and more specifically relates to a method for producing a plurality of liquid crystal display panels from a panel assembly (oversize panel) for providing a plurality of liquid crystal display panels, the liquid crystal display panels having a panel thickness smaller than that of the panel assembly.

BACKGROUND ART

A liquid crystal display panel is widely known in recent years as a display of a household electrical appliance such as a computer and a television device. The liquid crystal display panel has a configuration that a pair of substrates consisting of a thin film transistor (TFT) substrate and a color filter (CF) substrate are opposed attached to each other so as to be parallel to each other while having a given space therebetween, in which liquid crystals are sealed.

Generally, a plurality of TFTs, and pixel electrodes connected thereto are arranged in a matrix on the TFT array substrate. Meanwhile, color layers are arranged in a matrix on the CF substrate, and a common electrode is provided over the CF substrate. By varying a voltage applied to the electrodes, alignment of the liquid crystals can be controlled.

In producing the liquid crystal display panel described above, until the midway of the production process, processes of forming pixel electrodes and color layers for a plurality of liquid crystal display panels are performed on oversize mother substrates (oversize glass substrates for providing a plurality of liquid crystal display panels) while the mother substrates are yet to be divided.

Then, the mother substrates are attached to each other first to make an oversize panel, and then the panel is divided into a plurality of liquid crystal display panels. Alternatively, each of the mother substrates is divided first and then attached to each other to make a plurality of liquid crystal display panels (see FIGS. 11A and 11B).

A method for dividing the attached mother substrates as shown in FIG. 1A is used for providing miniature liquid crystal display panels used for mobile telephones or digital cameras. A method for attaching the divided mother substrates as shown in FIG. 1B is used for providing oversize liquid crystal display panels used for oversize liquid crystal televisions.

In these years, it is especially desired to achieve thin profiles and narrow frame regions of miniature liquid crystal display panels used for mobile telephones or digital cameras in order to achieve weight reduction and upsized screens of the panels. In this case, the thin profiles are achieved by achieving thin profiles of the substrates that make up liquid crystal display panels such as the above-described TFT substrates on which the pixel electrode are provided and the above-described CF substrates on which the color layers are provided. In addition, the narrow frame regions are achieved by widening the areas of display regions of the liquid crystal display panels, that is, by reducing the areas of the frame regions of the panels that surround the display regions.

PTL 1 indicated below discloses a technique concerning achieving a thin profile. To be specific, a TFT substrate assembly 200A that has a configuration such that portions to define display regions such as pixel electrodes for a plurality of liquid crystal display panels are arranged in a matrix on a mother substrate, and a CF substrate assembly 300A that has a configuration such that portions to define display regions such as color layers for a plurality of liquid crystal display panels are arranged in a matrix on a mother substrate are first attached to each other with seals 400 sandwiched therebetween so as to surround the display regions as shown in FIG. 12A. Then, liquid crystals 500 are provided in the display regions between the substrate assemblies 200A and 300A. Thus, a panel assembly (oversize panel) 100A is produced.

For example, in attaching the substrate assemblies 200A and 300A, the seals 400 having a frame shape that are made of a thermal hardening resin or an optical hardening resin are provided so as to surround the display regions of the CF substrate assembly 300A, and then the CF substrate assembly 300A and the TFT substrate assembly 200A are aligned opposed to each other in a vacuum chamber (not shown) to apply pressure to the substrate assemblies 200A and 300A under reduced pressure no higher than atmospheric pressure. Then, a process to put back the pressure in the vacuum chamber to atmospheric pressure, and a process to harden the seals 400 are performed.

Next, the panel assembly 100A is etched with the use of an etching liquid made of a fluorinated acid to achieve thin profiles of the substrate assemblies 200A and 300A as shown in FIG. 12B. In the etching, a process to soak the panel assembly 100A in the etching liquid stored in an etching bath (not shown) is performed.

Then, scribe grooves 200b and 300b used for division are formed on outer surfaces 200a and 300a of the substrate assemblies 200A and 300 respectively as shown in FIG. 12C. The scribe grooves 200b and 300b are formed by rotating a rotary blade of a cutter wheel (not shown) along lines for division, in this case, along regions where the seals 400 are disposed while pressing the rotary blade against the outer surfaces 200a and 300a.

Then, by dividing the panel assembly 100A along the scribe grooves 200b and 300b, a plurality of liquid crystal display panels 100 are obtained as shown in FIG. 12D.

Thus, thin profiles of the substrate assemblies 200A and 300A can be achieved while the substrate assemblies 200A and 300A are still in the state of the panel assembly 100A and yet to be divided, which brings an advantage of improving production efficiency compared with the case of achieving thin profiles of the substrate assemblies 200A and 300A for each liquid crystal display panel 100 after division.

CITATION LIST

Patent Literature

PTL 1: JP04-116619A

SUMMARY OF INVENTION

Technical Problem

However, dividing the panel assembly 100A that has a thin profile is difficult in dividing it with precision so that the liquid crystal display panels 100 have predetermined outside dimensions, compared with the case of dividing the panel assembly 100A that does not have a thin profile. Especially when narrow frame regions that are greatly desired are taken into consideration, the division needs to be performed with high precision because the division needs to be performed at regions where the seals are disposed.

A description of a specific manner for dividing the regions where the seals are disposed will be provided with reference to FIGS. 13A and 13B. As shown in FIG. 13A, the first scribe groove 200b is formed on the outer surface 200a of the TFT substrate assembly 200A at a position corresponding to the region where the seal 400 is disposed.

At this time, the first scribe groove 200b gets into deeply to reach the seal 400 due to the reduced thickness of the TFT substrate assembly 200A that is reduced by the etching and due to remaining stress resulting from the hardening of the seal 400. Thus, the TFT substrate assembly 200A is completely cut by the first scribe groove 200b.

Then, as shown in FIG. 13B, the second scribe groove 300b is formed on the outer surface 300a of the CF substrate assembly 300A at a position corresponding to the region where the seal 400 is disposed.

However, there arises the following problem. Because tensile stress in directions of arrows 201 is produced between end portions 200c of the TFT substrate assembly 200A and the seal 400 that is in contact therewith, and compression stress in directions of arrows 301 is produced as reaction force to the tensile stress between the CF substrate assembly 300A and the seal 400 that is in contact therewith, the second scribe groove 300b does not get deeply into the outer surface 300a of the CF substrate assembly 300A due to the compression stress, which causes a problem such that the second scribe groove 300b has a small depth (a small amount of penetration into the substrate).

If the second scribe groove 300b has the small (insufficient) depth (the small (insufficient) amount of penetration into the substrate), the panel assembly 100A is forced to be divided by applying an external force such as bending stress on the CF substrate assembly 300A. In such a case, the CF substrate assembly 300A is not divided at a predetermined position as shown in FIG. 14, or the seal 400 is not cut at a predetermined position (the center in a width direction), so that there arises a problem that the liquid crystal display panels 100 after division do not have predetermined outside dimensions.

In order to overcome the problems described above, a preferred embodiment of the present invention provides a method for producing liquid crystal display panels, by which favorable scribe grooves can be formed in producing a plurality of liquid crystal display panels from a panel assembly, the liquid crystal display panels having a panel thickness smaller than that of the panel assembly, which therefore allows contribution to thin profiles and narrow frame regions of the liquid crystal display panels.

Solution to Problem

A preferred embodiment of the present invention provides a method for producing a plurality of liquid crystal display panels from a panel assembly, the liquid crystal display panels having a panel thickness smaller than that of the panel assembly, the panel assembly being prepared by attaching a first substrate assembly having a plurality of display regions to a second substrate assembly having a plurality of display regions with seals sandwiched between the first and second substrate assemblies so as to surround the opposed display regions of the first and second substrate assemblies, the method including a first thinning step of thinning each of the first substrate assembly and the second substrate assembly by etching the panel assembly, a first scribe-formation step of forming, after the first thinning step, first scribe grooves on an outer surface of the first substrate assembly along regions where the seals are disposed, a second thinning step of further thinning, after the first scribe-formation step, each of the first substrate assembly and the second substrate assembly by etching the panel assembly, and developing the first scribe grooves formed on the outer surface of the first substrate assembly to expose portions of the seals at bottoms of the first scribe grooves, and a second scribe-formation step of forming, after the second thinning step, second scribe grooves on an outer surface of the second substrate assembly along the regions where the seals are disposed.

It is preferable that in the first scribe-formation step, the first scribe grooves are formed to reach the seals disposed on a surface of the first substrate assembly that is opposite to the outer surface. It is preferable that in the second scribe-formation step, the second scribe grooves are formed to reach the seals disposed on a surface of the second substrate assembly that is opposite to the outer surface.

It is preferable that in the first thinning step and in the second thinning step, the etching is performed while the panel assembly is soaked in an etching liquid. It is preferable that in the first scribe-formation step and in the second scribe-formation step, the first scribe grooves and the second scribe grooves are formed with the use of a wheel including a rotary blade.

It is preferable that the method further includes a step of preparing the panel assembly by forming, before the first thinning step, the seals so as to surround the display regions on the first substrate assembly or the display regions on the second substrate assembly, and dispensing liquid crystals in the regions surrounded by the seals to attach the first substrate assembly and the second substrate assembly to each other. It is preferable that the seals are formed to have a shape corresponding to four sides of a square shape, and in the first scribe-formation step and in the second scribe-formation step, the first scribe grooves and the second scribe grooves are formed to correspond to at least one of the four sides of each seal.

Advantageous Effects of Invention

The method for producing liquid crystal display panels of the present embodiment of the present invention includes the two thinning steps of thinning each of the first substrate assembly and the second substrate assembly by etching each of the first substrate assembly and the second substrate assembly, the first scribe-formation step of forming, after the first thinning step, the first scribe grooves on the outer surface of the first substrate assembly along the regions where the seals are disposed, and the second scribe-formation step of forming, after the second thinning step, the second scribe grooves on the outer surface of the second substrate assembly along the regions where the seals are disposed.

To be specific, the first thinning step is intended to thin each of the first substrate assembly and the second substrate assembly until they have a target thickness $T+\alpha$, that is, the order of a target thickness. The second thinning step is intended to develop the first scribe grooves formed on the first substrate assembly to expose the portions of the seals at the bottoms of the first scribe grooves, to keep a distance corresponding to the exposed portion of each seal between the end portions of the first substrate assembly on both sides of each first scribe groove, and to reduce or remove tensile stress that is produced between the end portions and the seals that are in contact with the end portions.

The reduction or removal of the tensile stress on the end portions of the first substrate assembly that are in contact with the seals can reduce or remove compression stress that is produced as reaction force to the tensile stress on portions of the second substrate assembly where the second scribe grooves are to be formed. Thus, in forming the second scribe grooves, the depth of the second scribe grooves (the amount of penetration into the substrate) can be made larger than those of conventional scribe grooves.

This configuration can eliminate the conventional need that the panel assembly is forced to be divided by applying an external force such as bending stress. Thus, the panel assembly can be divided with precision so that the liquid crystal display panels after the division have predetermined outside dimensions. The method for producing liquid crystal display panels of the present embodiment of the present invention allows scribe grooves to be formed favorably at the regions where the seals are disposed, which therefore allows contribution to thin profiles and narrow frame regions of the liquid crystal display panels.

In this case, if in the first scribe-formation step, the first scribe grooves are formed to reach the seals disposed on a surface of the first substrate assembly that is opposite to the outer surface, an etching liquid, if used in the etching, soaks deeply into the first scribe grooves with ease. Thus, the portions of the seals can be exposed with ease, whereby the distance corresponding to the exposed portion of each seal can be easily kept between the end portions of the first substrate assembly on both sides of each first scribe groove.

In addition, if in the second scribe-formation step, the second scribe grooves are formed to reach the seals disposed on a surface of the second substrate assembly that is opposite to the outer surface, the panel assembly is easily divided into a plurality of liquid crystal display panels having predetermined outside dimensions.

DESCRIPTION OF EMBODIMENTS

A detailed description of a preferred embodiment of a method for producing liquid crystal display panels of the present invention will now be provided with reference to the accompanying drawings.

Figure 1A:
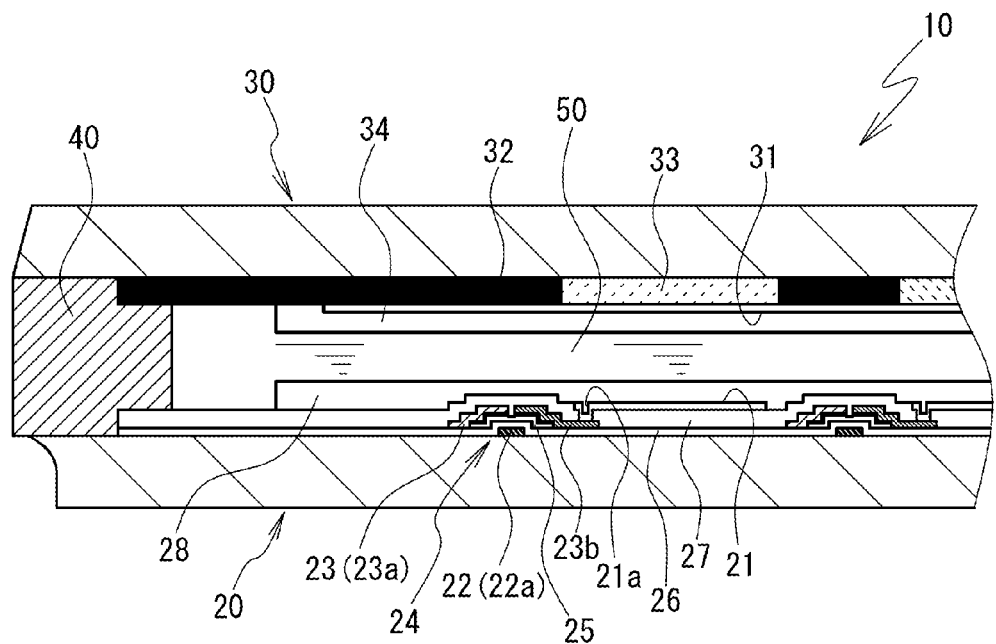
FIG. 1A is a cross-sectional view schematically showing a part of a liquid crystal display panel to which a method for producing liquid crystal display panels of the present invention is applied.

First, a description of the method for producing the liquid crystal display panels of the present embodiment of the present invention will be provided with reference to FIG. 1A. As shown in FIG. 1A, a liquid crystal display panel 10 includes a TFT substrate 20, a CF substrate 30 that is opposed to the TFT substrate 20, and a liquid crystals 50 that is sealed in between the substrates 20 and 30 by the substrates 20 and 30 and a seal 40.

A plurality of pixel electrodes 21 are arranged in a matrix on the TFT substrate 20. Gate lines 22 that define scanning lines and source lines 23 that define image signal lines are arranged perpendicular to each other so as to surround each of the pixel electrodes 21.

The gate lines 22 and the source lines 23 intersect with each other such that the source lines 23 are disposed on the gate lines 22 at the intersections. The gate lines 22 and the source lines 23 are electrically insulated from each other at the intersections while having a gate insulating film 26 sandwiched therebetween. Thin film transistors (TFTs) 24, which define switching elements connected to gate electrodes 22a that define portions of the gate lines 22, are disposed at the intersections of the gate lines 22 and the source lines 23.

Semiconductor films 25 are disposed on the gate insulating film 26 at regions where the TFTs 24 are disposed so as to overlap with the gate electrodes 22a. Source electrodes 23a that define portions of the source lines 22, and drain electrodes 23b are disposed on the semiconductor films 25.

In this case, the source electrodes 23a and the drain electrodes 23b are disposed apart from each other on both the ends of the semiconductor films 25 disposed on the gate electrodes 22a. Then, the drain electrodes 23b are connected to the pixel electrodes 21 via contact holes 21a thereof.

The TFTs 24 are ON/OFF controlled by scanning signal voltages that are supplied from the gate electrodes 22a of the gate lines 22. Image signal voltages supplied from source electrodes 23a of the source lines 23 are supplied to the pixel electrodes 21 via the drain electrodes 23b and the contact holes 21a by the ON control of the TFTs 24.

The TFTs 24 are covered with an interlayer insulating film 27 disposed on the gate insulating film 26. The pixel electrodes 21 are disposed on the interlayer insulating film 27. The pixel electrodes 21 are preferably made of a transparent conductive film such as ITO (Indium-Tin Oxide). An alignment film 28 of which a surface is subjected to rubbing is disposed on the pixel electrodes 21, and is arranged to control alignment of the liquid crystals 50 in a predetermined direction.

A black matrix (BM) 32 in a reticular pattern is disposed on the CF substrate 30, which is opposed to the TFT substrate 20 described above, so as to shield a region where the gate lines 22 and the source lines 23 are disposed. Color layers 33 of red, green, and blue are provided in regions surrounded by the BM 32.

A common electrode 31 that is common to the pixel electrodes 21 is disposed under the color layers 33. The pixel common electrode 31 is also preferably made of a transparent conductive film such as ITO (Indium-Tin Oxide). Alignment film 34 of which a surface is subjected to rubbing is disposed under the common electrode 31, and is arranged to control alignment of the liquid crystals 50 in a predetermined direction.

Figure 1B:
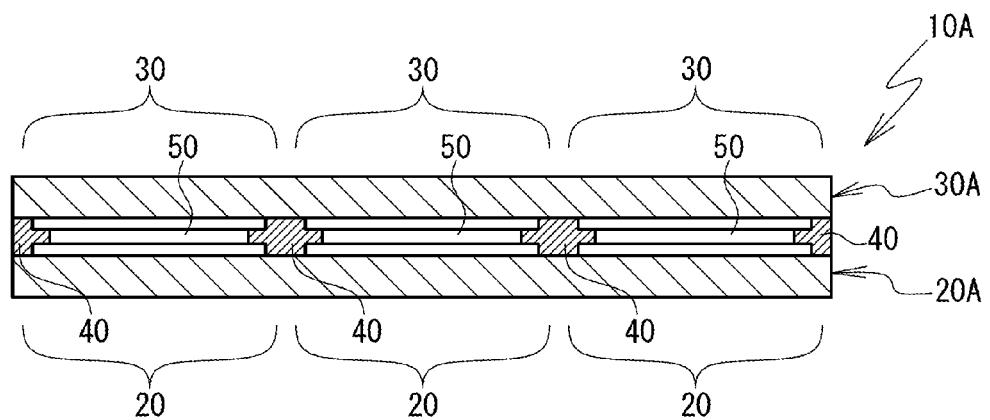
FIG. 1B is a cross-sectional view schematically showing a panel assembly before divided into a plurality of liquid crystal display panels.
Figure 5:
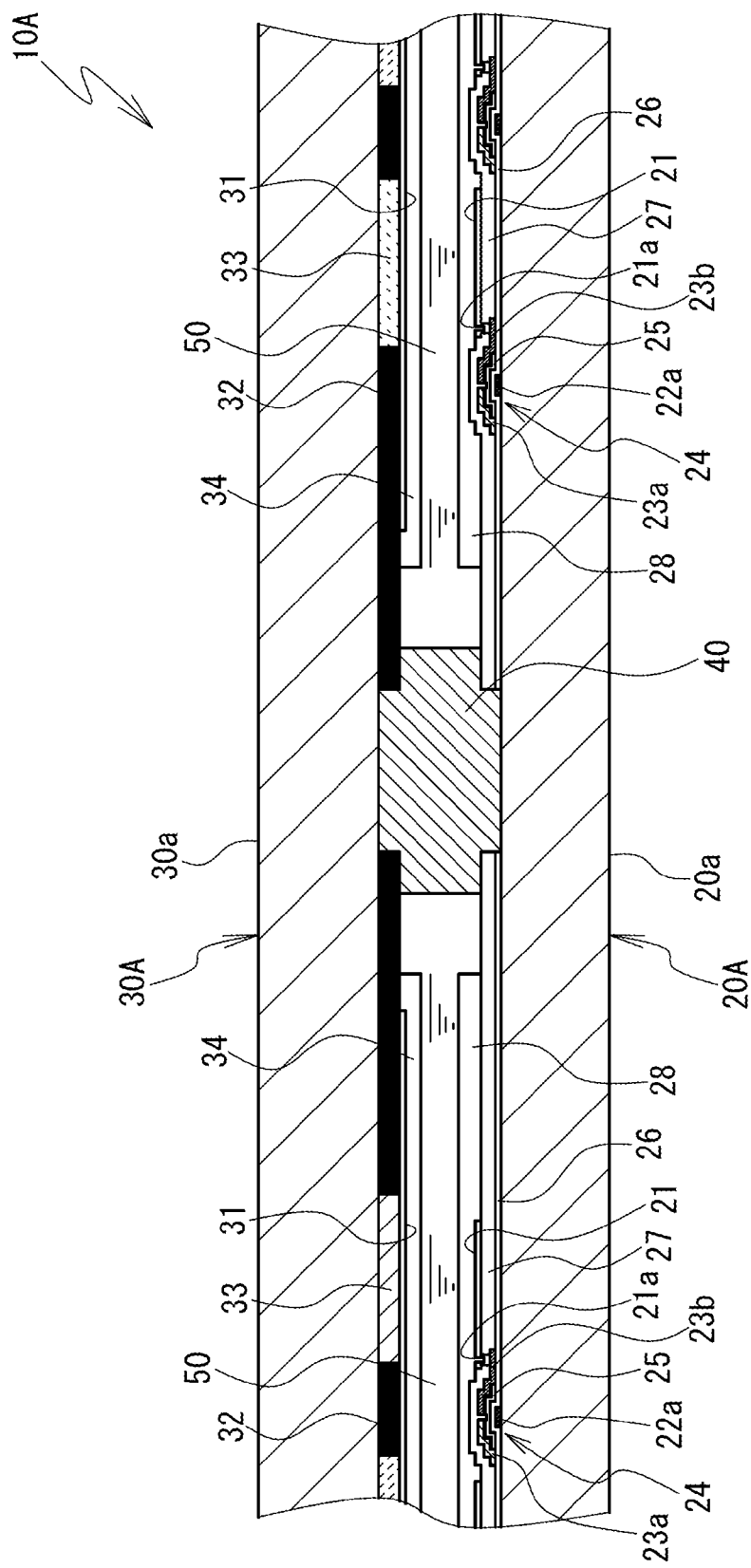
FIG. 5 is a partially enlarged cross-sectional view showing a peripheral portion of a seal in the panel assembly that is yet to be thinned.

The TFT substrate 20 and the CF substrate 30 are each produced from oversize glass substrates (mother substrates) that are larger in size than the TFT substrate 20 and the CF substrate 30 and defined as a TFT substrate assembly (first substrate assembly) 20A in which TFT substrates 20 are arranged in a matrix and a CF substrate assembly (second substrate assembly) 30A in which CF substrates 30 are arranged in a matrix as shown in FIG. 1B and FIG. 5. In this case, the mother substrates define oversize glass substrates for providing a plurality of liquid crystal display panels, which have a rectangular shape and a thickness of about 0.7 m.

Figure 3:
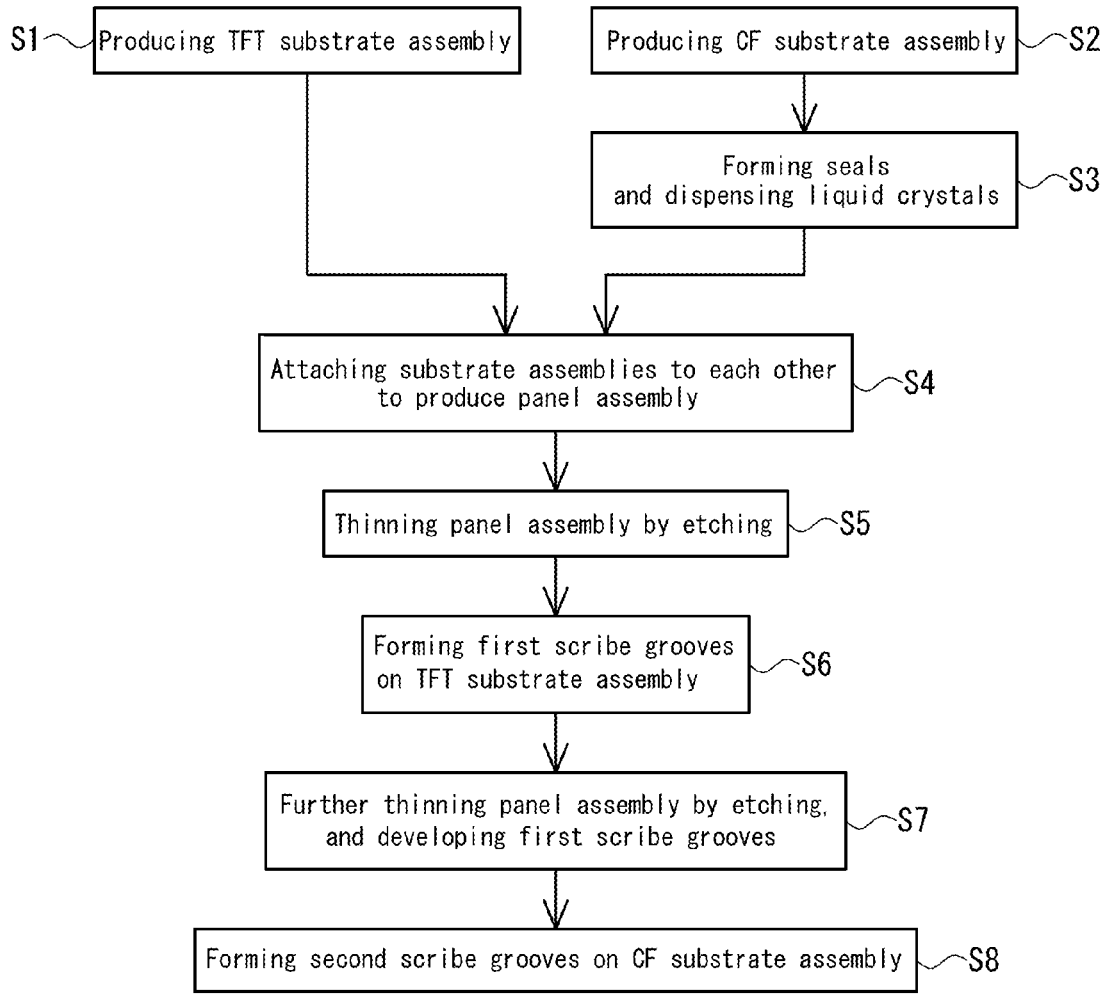
FIG. 3 is a flow chart for illustrating the process of the method for producing liquid crystal display panels of the present invention.

FIG. 3 is a flow chart for illustrating the process of the method for producing the liquid crystal display panels. This production method includes a step S1 of producing a TFT substrate assembly (first substrate assembly), a step S2 of producing a CF substrate assembly (second substrate assembly), a step S3 of forming seals and dispensing liquid crystals, a step S4 of attaching the substrate assemblies to each other, a step S5 of first thinning by etching, a step S6 of forming first scribe grooves, a step S7 of second thinning by etching, and a step S8 of forming second scribe grooves.

First, a description of the step S1 of producing the TFT substrate assembly (first substrate assembly) is provided. Single-layer or multilayer conductive films made of tungsten, titanium, aluminum and chromium are formed on a glass substrate (mother substrate). The conductive films are formed preferably using variety of known sputtering methods. The formed conductive films are then formed to have a predetermined pattern preferably using photolithography. Thus, the gate lines 22 and gate electrodes 22a that form the predetermined pattern are obtained.

Next, the gate insulating films 26 are formed. The gate insulating films 26 are made preferably of silicon nitride, and formed preferably using a plasma CVD method. Then, the semiconductor films 25, the source lines 23, the source electrodes 23a and the drain electrodes 23b are formed on the gate insulating films 26.

The semiconductor films 25 are made preferably of n+type amorphous silicon, and formed preferably using a plasma CVD method. The source lines 23, the source electrodes 23a and the drain electrodes 23b are formed in a manner similar to the manner for forming the gate lines 22 described above.

Next, the interlayer insulating films 27 made of a photosensitive resin are formed. Openings for forming the contact holes 21a are formed in the interlayer insulating films 27. The openings are formed preferably using photolithography. Then, transparent conductive films made of ITO are formed on the interlayer insulating films 27 preferably using a sputtering method. The formed transparent conductive films are then formed to have a predetermined pattern preferably using photolithography. Thus, the pixel electrodes 21 and the contact holes 21a that form the predetermined pattern are obtained.

After the pixel electrodes 21 are formed, the alignment films 28 are formed. An alignment material in a liquid state preferably made of polyimide is coated using a cylinder printing press or an ink jet printer. Then, the substrate is heated preferably using a baking system to bake the coated alignment material, and a surface thereof is subjected to rubbing. Thus, the alignment films 28 in a solid state are obtained on the pixel electrodes 21. Through the above-described process, the TFT substrate assembly 20A is produced, in which the TFT substrates 20 are arranged in a matrix that are yet to be divided as shown in FIG. 1B and FIG. 5.

Next, a description of the step S2 of producing the CF substrate assembly (second substrate assembly) is provided. A BM resist (a photosensitive resin containing a black coloring agent) is coated on a glass substrate (mother substrate). The coated BM resist is then formed to have a predetermined pattern preferably using photolithography. Thus, the black matrixes (BM) 32 of the predetermined pattern are obtained.

Next, color resists of red, green, and blue (solutions prepared by dispersing pigments of the predetermined colors in photosensitive resins) are coated, and then formed to have a predetermined pattern preferably using photolithography. Thus, the color layers 33 of the predetermined pattern are obtained. Then, transparent conductive films made of ITO are formed on the color layers 33 preferably using a sputtering method to obtain the common electrodes 31.

Next, the alignment films 34 are formed on the common electrodes 31. An alignment material in a liquid state preferably made of polyimide is coated using a cylinder printing press or an ink jet printer. Then, the substrate is heated preferably using a baking system to bake the coated alignment material, and a surface thereof is subjected to rubbing. Thus, the alignment films 34 in a solid state are obtained under the common electrodes 31. Through the above-described process, the CF substrate assembly 30A is produced, in which the CF substrates 30 are arranged in a matrix that are yet to be divided as shown in FIG. 1B and FIG. 5.

Next, after producing the TFT substrate assembly 20A and the CF substrate assembly 30A separately as described above, in the step S3 of forming seals and dispensing liquid crystals, the seals 40 that are made of a thermal hardening resin or an optical hardening resin are formed into a frame shape so as to each surround the alignment films 34 of the CF substrate assembly 30A using a screen printing method, and the liquid crystals 50 are dispensed into the regions surrounded by the seals 40.

Then, in the step S4 of attaching the substrate assemblies to each other, TFT substrate assembly 20A, and the CF substrate assembly 30A on which the seals 40 are formed are aligned opposed to each other in a vacuum chamber (not shown) to apply pressure to the substrate assemblies 20A and 30A under reduced pressure no higher than atmospheric pressure.

Then, the pressure in the vacuum chamber is put back to atmospheric pressure, so that the TFT and CF substrate assemblies 20A and 30A are maintained all the time in a state under pressure by a difference between atmospheric pressure and pressure inside the TFT and CF substrate assemblies 20A and 30A.

Then, the seals 400 are hardened, whereby the attachment of the TFT and CF substrate assemblies 20A and 30A is completed. Thus, a panel assembly 10A is produced, in which the liquid crystal display panels 10 are arranged in a matrix that are yet to be divided as shown in FIG. 1B and FIG. 5.

Figure 2:
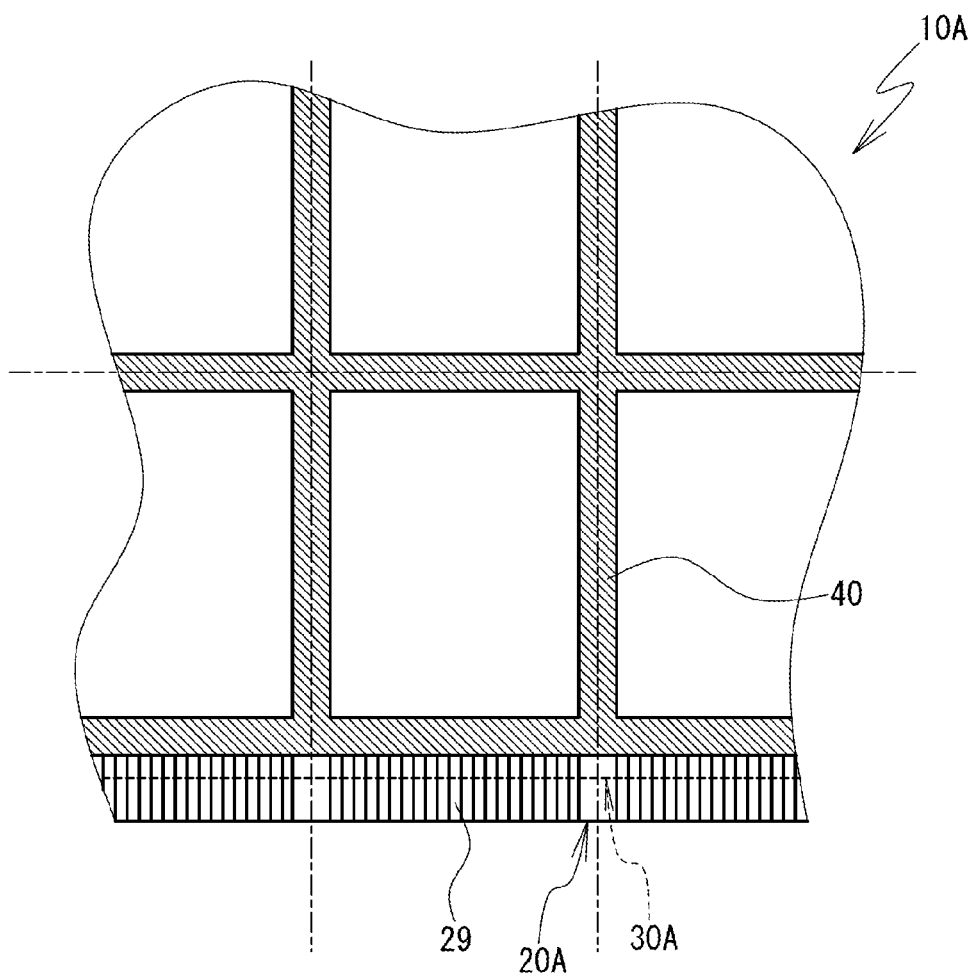
FIG. 2 is a plan view schematically showing positions for division (positions for cutting) of the panel assembly shown in FIG. 1B.

FIG. 2 is a plan view showing the panel assembly 10A shown in FIG. 1B, and the dashed-dotted lines therein indicate lines for division (lines for cutting) where scribe grooves 20b and 30b, which are described later, are to be formed. The seals 40 are formed in a reticular pattern so as to surround a plurality of display regions as shown in FIG. 2. In the present embodiment, division (cutting) is performed on the panel assembly 10A and the seals 40 at given regions among all the regions where the seals 40 are formed, the given regions corresponding to three sides around each display region except one side where a terminal member 29 of the TFT substrate assembly 20A is provided. To be specific, the division (cutting) is performed at substantial centers in width directions of the regions corresponding to the three sides where the seals 40 are formed. Thus, the two adjacent liquid crystal display panels 10 share one region where the seal 40 is formed, which allows contribution to improvement in use efficiency of the liquid crystal display panels 10 with respect to the mother substrate, and narrow frame regions of the liquid crystal display panels 10.

Next, a description of the process of thinning the panel assembly 10A, and dividing it into the plurality of liquid crystal display panels 10 (the steps 5 to 8) is provided with reference to FIGS. 5 to 10 while referring to the flow chart of FIG. 3. FIGS. 5 to 10 are enlarged cross-sectional views showing a peripheral portion of a seal 40 in the panel assembly 10A shown in FIG. 1B.

First, in the first thinning step S5, each of the TFT substrate assembly 20A and the CF substrate assembly 30A is thinned by etching until they have a target thickness T (e.g., 0.05 to 0.5 mm, preferably 0.1 to 0.3 mm)+α (e.g., 50 to 100 μm).

Figure 4A:
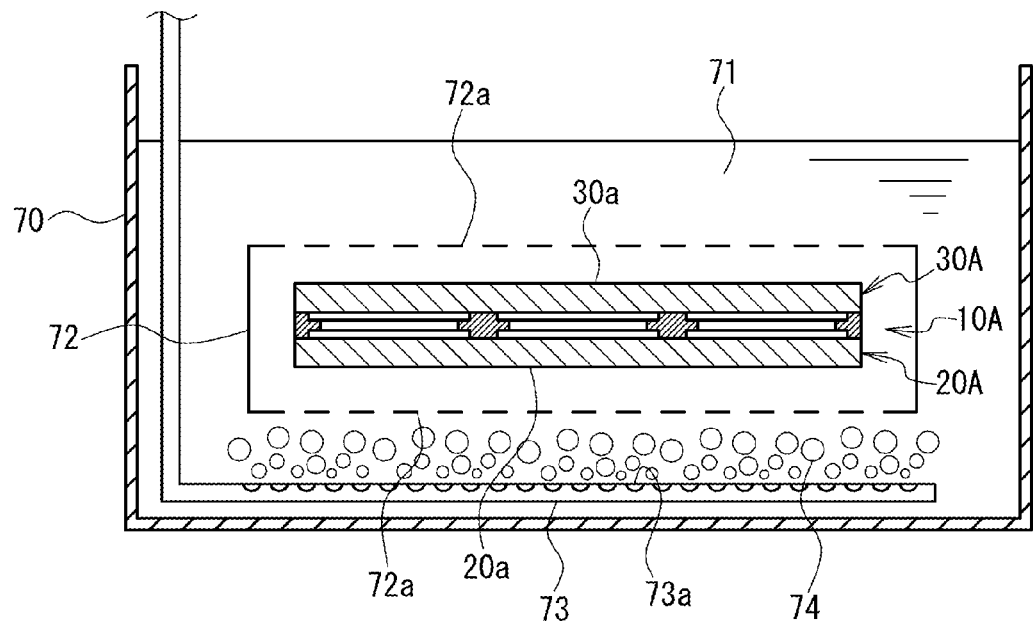
FIG. 4A is a cross-sectional view schematically showing an etching bath that is used in thinning the panel assembly.

The etching is performed by soaking the panel assembly 10A in an etching liquid 71 in an etching bath 70 as shown in FIG. 4A. In the present embodiment, the panel assembly 10A is soaked in the etching liquid 71 with the use of a tray 72 for housing the panel assembly 10A.

An upper surface and a lower surface of the tray 72 include a lot of openings 72a, and thus the tray 72 is filled with the etching liquid 71 through the openings 72a. The etching liquid 71 is used for the etching of the panel assembly 10A inside the tray 72.

An air supply pipe 73 connected to an air supply pump (not shown) is disposed at the bottom of the etching bath 70. The air supply pipe 73 includes a lot of small openings 73a. Air bubbles 74 are generated by blowing off gas such as a nitrogen gas that is supplied from the air supply pump, which allows the etching liquid 71 in the etching bath 70 to be stirred.

First, the panel assembly 10A is housed in the tray 72, and the tray 72 is soaked in the etching liquid 71 in the etching bath 70. The etching of the TFT substrate assembly 20A and the CF substrate assembly 30A of the panel assembly 10A is performed while the air bubbles 74 are supplied to the etching liquid 71 from the air supply pipe 73 to stir the etching liquid 71 during the etching.

Figure 6:
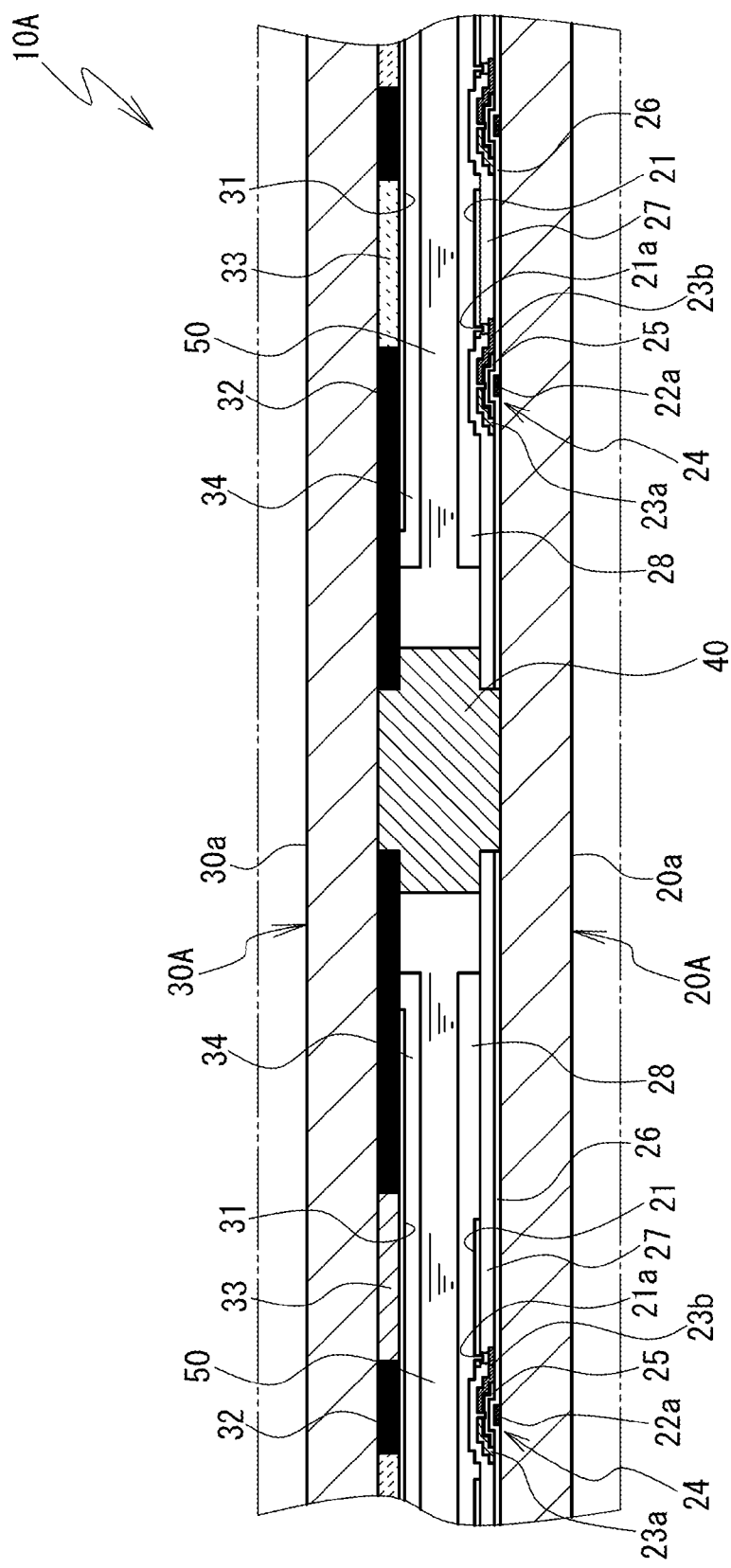
FIG. 6 is a partially enlarged cross-sectional view showing the peripheral portion of the seal in the panel assembly that is thinned through a first thinning step.

As the etching proceeds, an outer surface 20a of the TFT substrate assembly 20A and an outer surface 30a of the CF substrate assembly 30A are etched by degrees, so that the TFT substrate assembly 20A and the CF substrate assembly 30A successively diminish in thickness as shown in FIG. 6.

Then, when each of the TFT substrate assembly 20A and the CF substrate assembly 30A is thinned by etching until they have the target thickness T (e.g., 0.05 to 0.5 mm, preferably 0.1 to 0.3 mm)+α (e.g., 50 to 100 μm), the tray 72 housing the panel assembly 10A is picked up from the etching bath 70, and the etching in the first thinning step S5 is terminated.

Figure 4B:
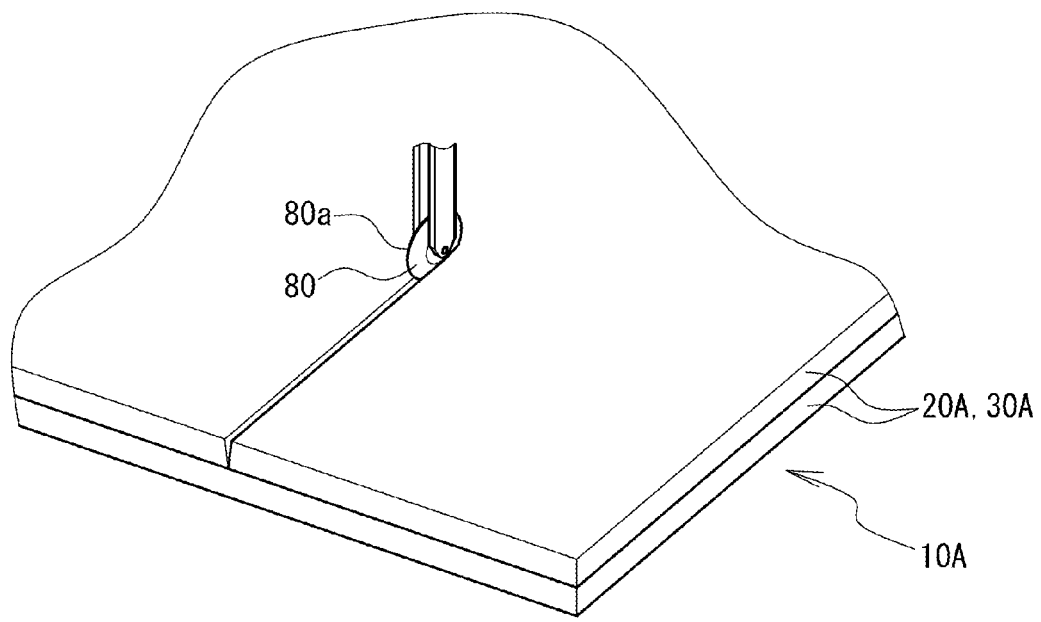
FIG. 4B is an external perspective view schematically showing a cutter wheel that is used in forming a scribe groove.
Figure 7:
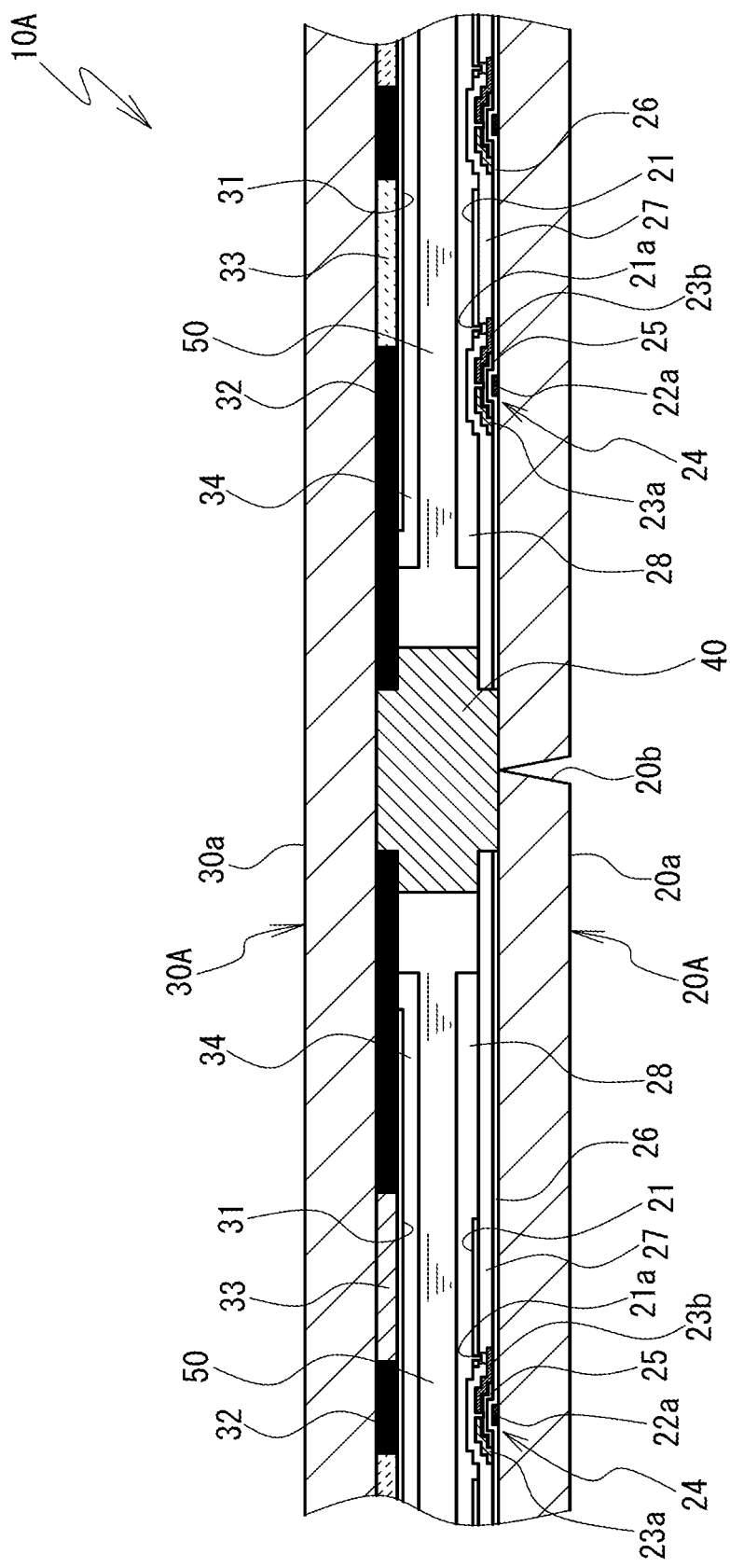
FIG. 7 is a partially enlarged cross-sectional view showing the peripheral portion of the seal in the panel assembly where a first scribe groove is formed through a first scribe-formation step.

Next, after the first thinning step S5, the first scribe-formation step S6 is performed. A first scribe groove 20b is formed on the outer surface 20a of the TFT substrate assembly 20A as shown in FIG. 7. The first scribe groove 20b is formed by rotating and pressing a cutter wheel 80 including a rotary blade 80a shown in FIG. 4B along the region where the seal 40 is disposed.

The cutter wheel 80 is made preferably of a single crystal of artificial diamond. A perimeter portion of the wheel has a tapered shape, and thus the perimeter has the shape of the letter V in cross section.

To be specific, by rotating the cutter wheel 80 in a longitudinal direction of the seal 40 while pressing the cutter wheel 80 on the outer surface 20a at the position corresponding to the center in the width direction of the seal 40, the first scribe groove 20b having the shape of the letter V in cross section is formed.

In this case, the depth of the first scribe groove 20b (the amount of penetration into the substrate) is large to reach the seal 40, and accordingly the TFT substrate assembly 20A is completely cut by the first scribe groove 20b as shown in FIG. 7 due to the reduced thicknesses of the TFT substrate assembly 20A and the CF substrate assembly 30A through the first thinning step S5 and due to remaining stress resulting from the hardening of the seal 40.

Next, the second thinning step S7 of thinning the panel assembly 10A on which the first scribe groove 20b is formed as described above is performed. In the second thinning step S7, each of the TFT substrate assembly 20A and the CF substrate assembly 30A is thinned by etching them by the thickness of α (e.g., 50 to 100 μm), which is left unetched in the first thinning step S5, such that each of the TFT substrate assembly 20A and the CF substrate assembly 30A has the target thickness T (e.g., 0.05 to 0.5 mm, preferably 0.1 to 0.3 mm).

Figure 8:
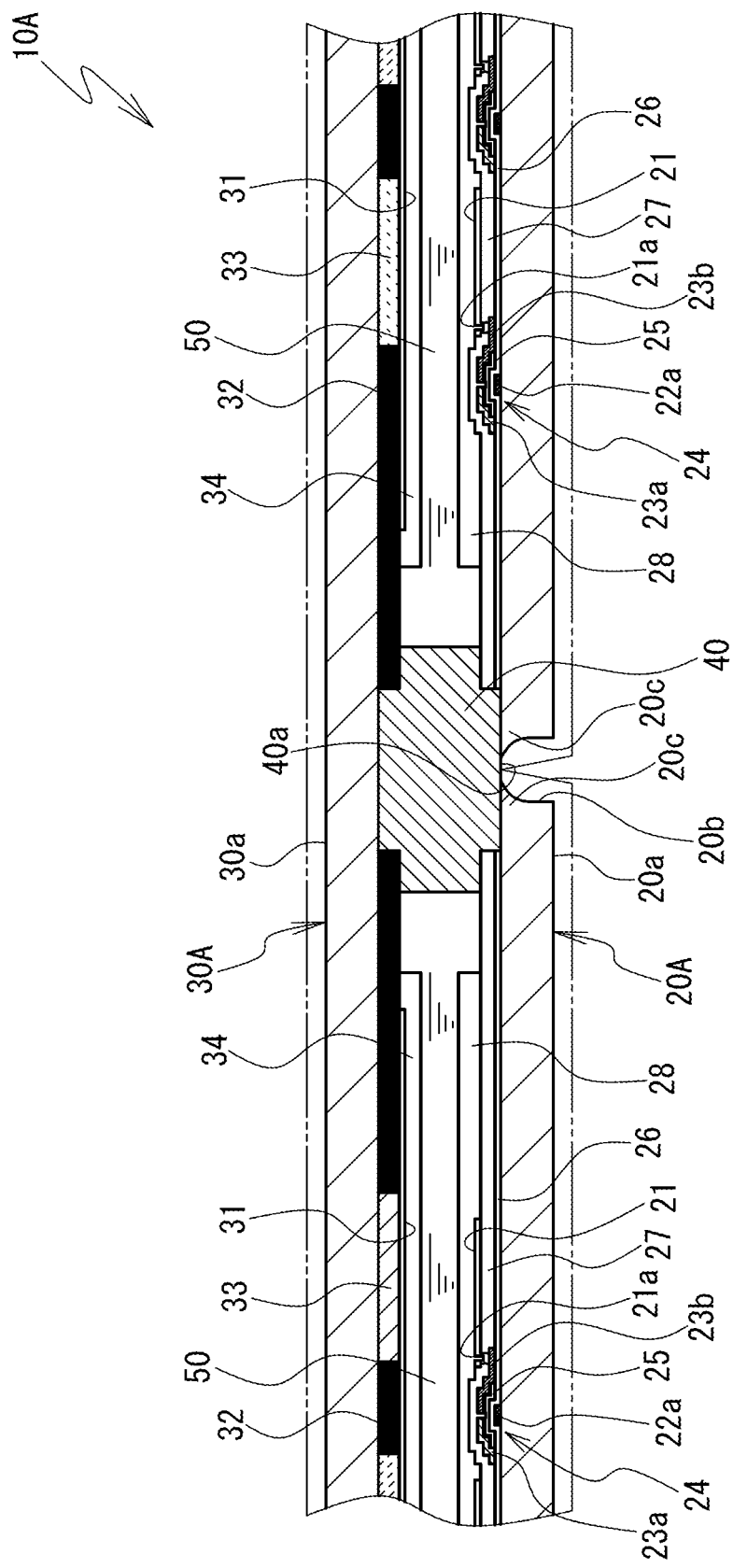
FIG. 8 is a partially enlarged cross-sectional view showing the peripheral portion of the seal in the panel assembly that is thinned through a second thinning step.

The second thinning step S7 is performed similarly to the first thinning step S5 described above by soaking the panel assembly 10A in the etching liquid 71 in the etching bath 70. Also in this case, as the etching proceeds, the outer surface 20a of the TFT substrate assembly 20A and the outer surface 30a of the CF substrate assembly 30A are etched by degrees, so that the TFT substrate assembly 20A and the CF substrate assembly 30A successively diminish in thickness as shown in FIG. 8.

At this time, the first scribe groove 20*b* formed on the outer surface 20*a* of the TFT substrate assembly 20A is also etched by degrees, and grows (develops) in a direction of the groove width and in a direction of the groove depth.

Thus, when the first scribe groove 20*b* grows (develops) in the groove depth direction toward the seal 40 while widening its opening (width) by the etching, the bottom of the first scribe groove 20*b* reaches the seal 40 to expose a portion of the seal 40. Then, end portions 20*c* of the TFT substrate assembly 20A that are provided by the grown first scribe groove 20*b* are apart as shown in FIG. 8, and the portion of the seal 40 is exposed between the end portions 20*c* (exposed portion 40*a*). In this case, even if exposed as described above, the seal 40 is not etched by the etching liquid 71 because it is made of the material resistant to the etching liquid 71.

In addition, because the depth of the first scribe groove 20*b* (the amount of penetration into the substrate) before the etching is large to reach the seal 40, the etching liquid 71 soaks deeply into the first scribe groove 20*b* with ease during the etching up to a portion that is in contact with the seal 40. Thus, the portion of the seal 40 (exposed portion 40*a*) can be exposed with ease.

Figure 13A:
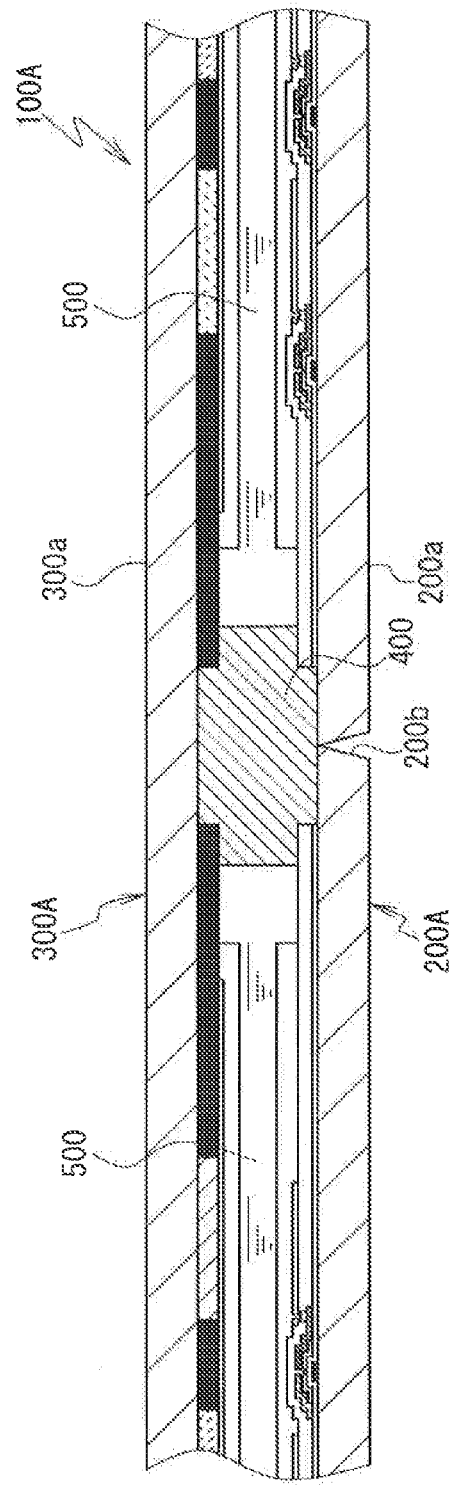
FIG. 13A is an enlarged cross-sectional view showing a peripheral portion of a seal in a panel assembly where a first scribe groove is formed after thinned.
Figure 13B:
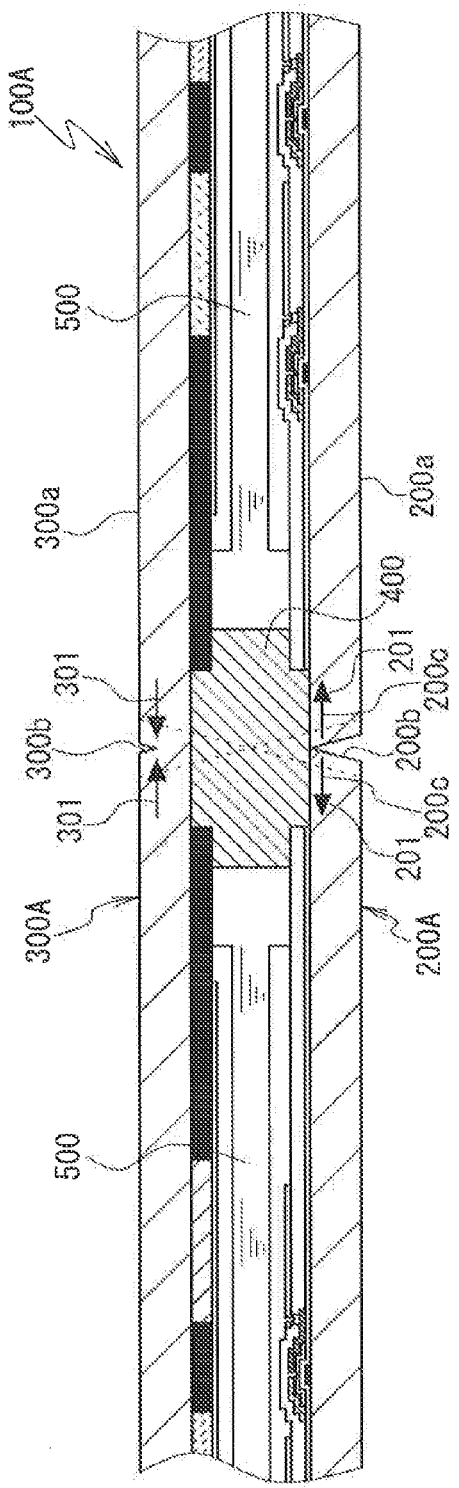
FIG. 13B is a cross-sectional view showing the panel assembly shown in FIG. 13A where a second scribe groove is formed.
Figure 14:
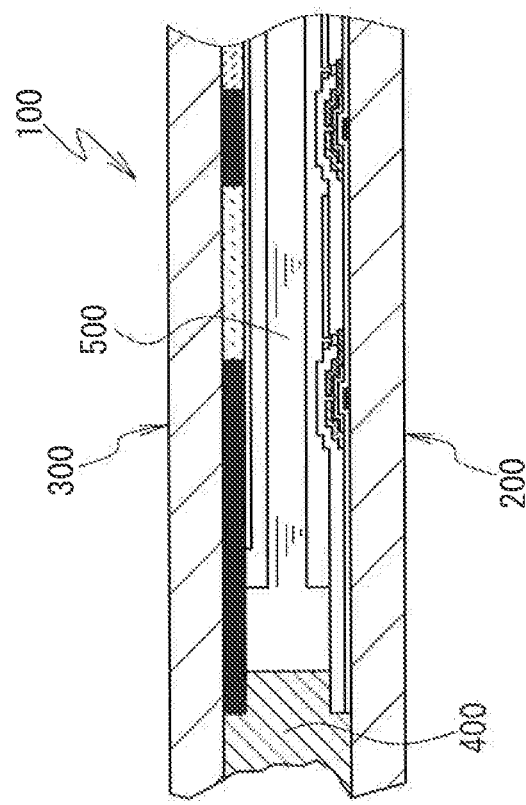
FIG. 14 is a cross-sectional view showing the panel assembly shown in FIG. 13B that is divided into a plurality of liquid crystal display panels.
Figure 14:
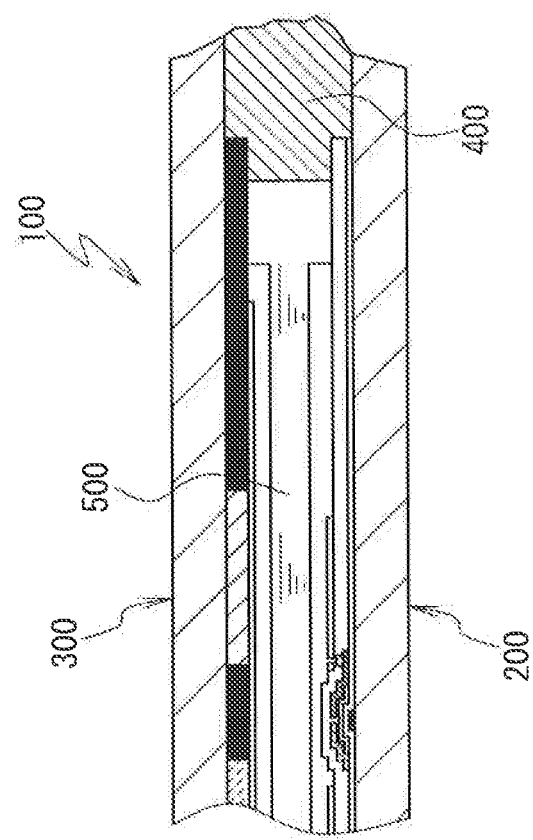

A distance corresponding to the exposed portion 40*a* is kept between the end portions 20*c* of the TFT substrate assembly 20A that are disposed so as to sandwich the exposed portion 40*a* of the seal 40, which can reduce or remove tensile stress that is produced in both of the right and left directions between the end portions 20*c* and the exposed portion 40*a* that is in contact with the end portions 20*c*, the tensile strength being indicated with the arrows 201 in FIG. 13B described in the Background Art.

A by-product material (residual material of the etching reaction) is produced on an inner surface of the first scribe groove 20*b* during the etching of the first scribe groove 20*b*. However, because the TFT substrate assembly 20A around the first scribe groove 20*b* has been thinned in advance to have the target thickness during the first thinning step S5, the amount of the produced by-product material is small and easily removed by the bubbling of the air bubbles 74 that are supplied from the air supply pipe 73 of the etching bath 70 that is described above. Thus, the first scribe groove 20*b* can be controlled to have a bottom of a predetermined depth (a predetermined etching amount).

Then, when each of the TFT substrate assembly 20A and the CF substrate assembly 30A is thinned by etching until they have the target thickness T (e.g., 0.05 to 0.5 mm, preferably 0.1 to 0.3 mm), the tray 72 housing the panel assembly 10A is picked up from the etching bath 70, and the etching in the second thinning step S7 is terminated.

Figure 9:
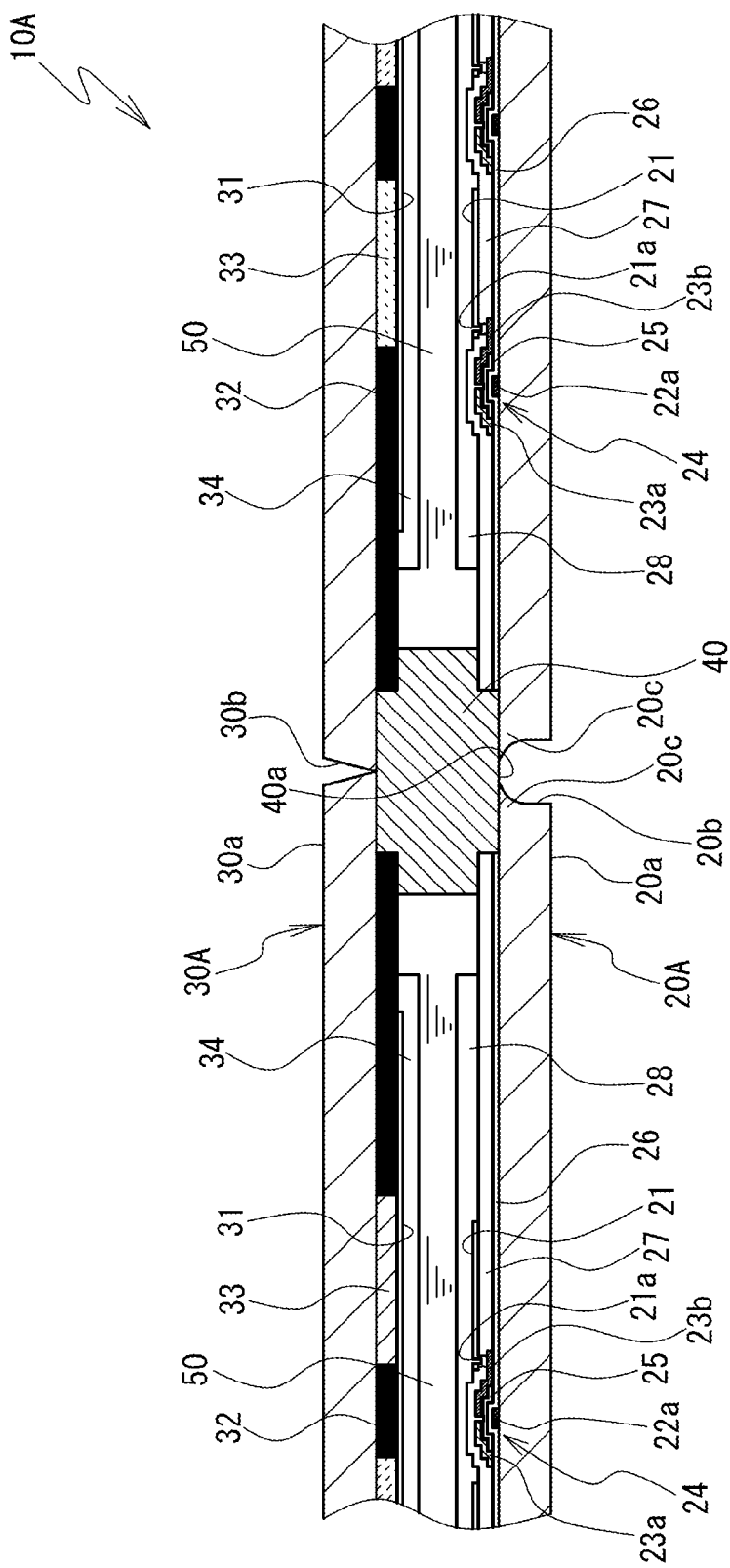
FIG. 9 is a partially enlarged cross-sectional view showing the peripheral portion of the seal in the panel assembly where a second scribe groove is formed through a second scribe-formation step.

Next, after the second thinning step S7, the second scribe-formation step S8 is performed. A second scribe groove 30*b* is formed on the outer surface 30*a* of the CF substrate assembly 30A as shown in FIG. 9. Also in this case, the second scribe groove 30*b* is formed by rotating and pressing the cutter wheel 80 including the rotary blade 80*a* shown in FIG. 4B along the region where the seal 40 is disposed.

To be specific, by rotating the cutter wheel 80 in the longitudinal direction of the seal 40 while pressing the cutter wheel 80 on the outer surface 30*a* at the position corresponding to the center in the width direction of the seal 40, the second scribe groove 30*b* having the shape of the letter V in cross section is formed.

At this time, the reduction or removal of the tensile stress produced by the first scribe groove 20*b* having developed in the second thinning step S7 between the end portions 20*c* of the TFT substrate assembly 20A and the seal 40 that is in contact with the end portions 20*c* can reduce or remove compression stress that is produced as reaction force to the tensile stress on a portion of the CF substrate assembly 30A where the second scribe groove 30*b* is formed, the compression stress being indicated with the arrows 301 in FIG. 13B described in the Background Art. Thus, in forming the second scribe groove 30*b*, the depth of the second scribe groove 30*b* (the amount of penetration into the substrate) can be made larger than that of a conventional scribe groove.

Figure 10:
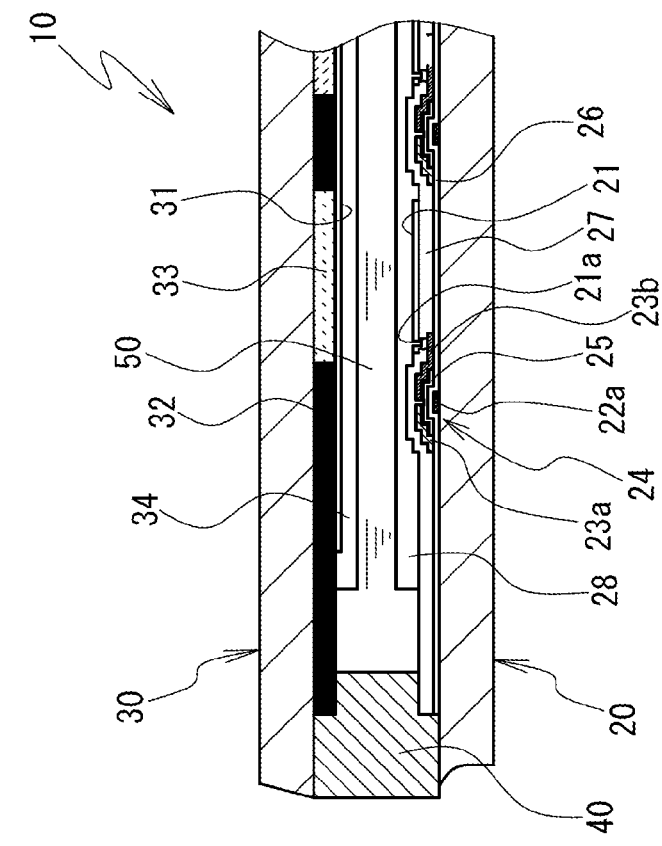
FIG. 10 is a partially enlarged cross-sectional view showing the peripheral portion of the seal of liquid crystal display panels that are divided of the panel assembly.
Figure 10:
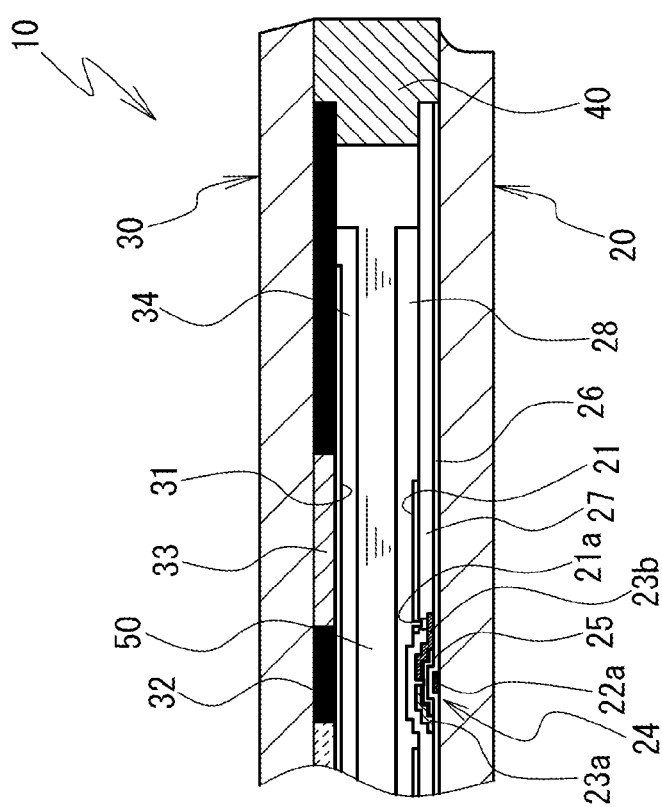
Figure 11A:
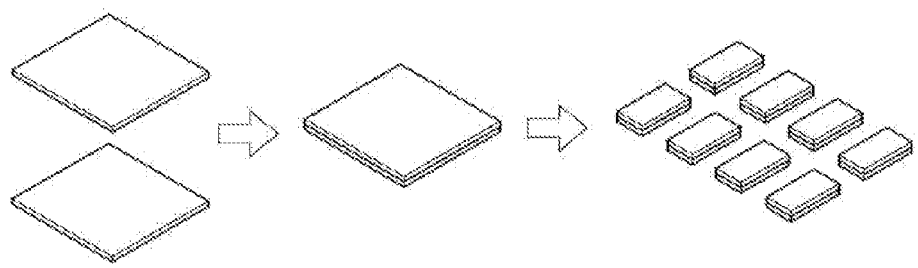
FIG. 11A is a view illustrating the process of first attaching mother substrates to each other and then cutting them to produce a plurality of liquid crystal display panels.
Figure 11B:
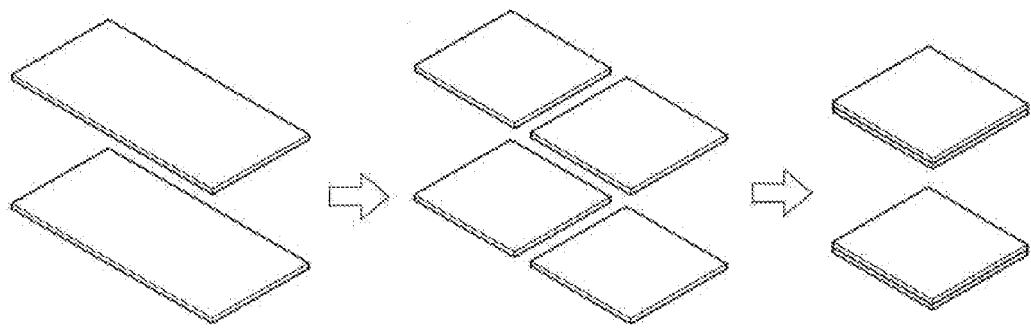
FIG. 11B is a view illustrating the process of first cutting each of mother substrates and then attaching them to each other to produce a plurality of liquid crystal display panels.
Figure 12A:
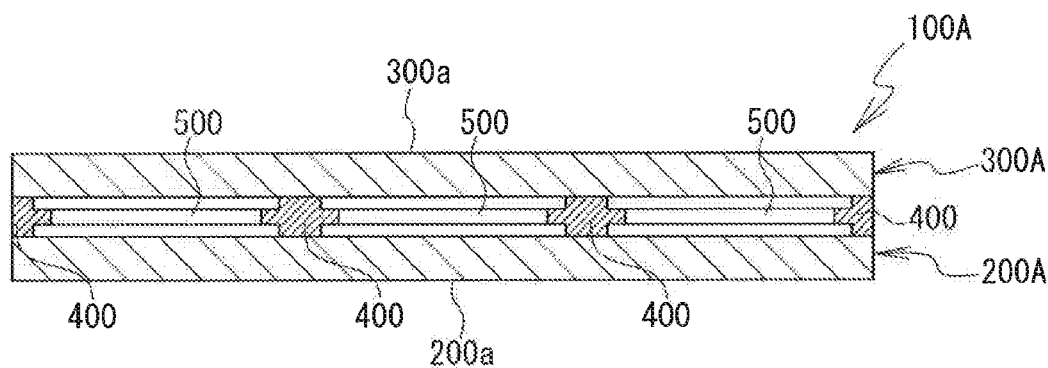
FIG. 12A is a cross-sectional view schematically showing a panel assembly in an initial state in a conventional production process of liquid crystal display panels.
Figure 12B:
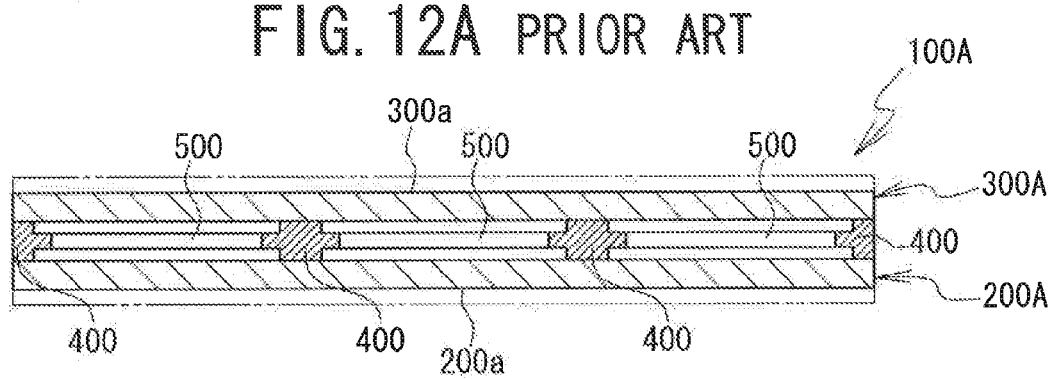
FIG. 12B is a cross-sectional view schematically showing the panel assembly after thinned.
Figure 12C:
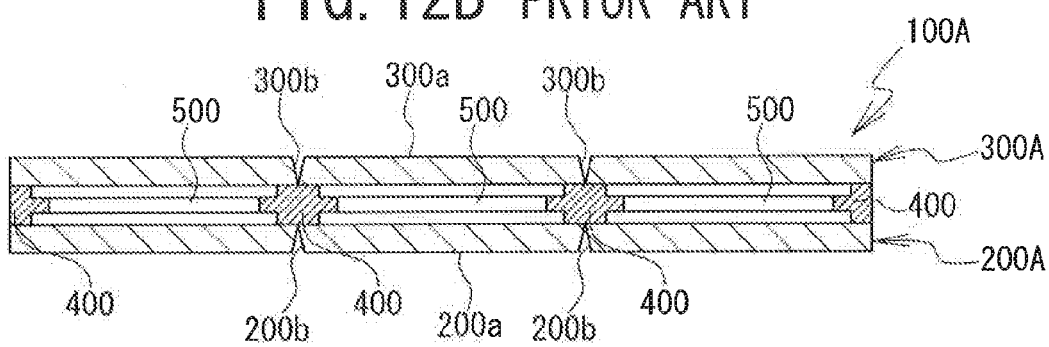
FIG. 12C is a cross-sectional view schematically showing the panel assembly where scribe grooves are formed.
Figure 12D:
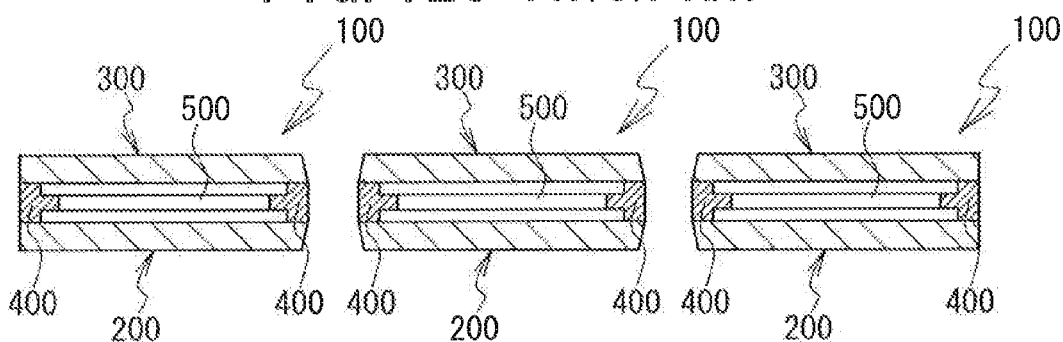
FIG. 12D is a cross-sectional view schematically showing the panel assembly that is divided into a plurality of liquid crystal display panels.

Thus, the depth of the second scribe groove 30*b* (the amount of penetration into the substrate) can be made large to reach the seal 40 as shown in FIG. 9, which allows the seal 40 to be cut at a predetermined position (at the center in the width direction of the seal 40). Accordingly, the panel assembly 10A can be divided into the liquid crystal display panels 10 with precision as shown in FIG. 10 so that the liquid crystal display panels 10 after the division have predetermined outside dimensions.

The method for producing liquid crystal display panels of the present invention includes the two thinning steps of thinning each of the TFT substrate assembly 20A and the CF substrate assembly 30A of the panel assembly 10A by etching each of the TFT substrate assembly 20A and the CF substrate assembly 30A, the first scribe-formation step S6 of forming, after the first thinning step S5, the first scribe grooves 20*b* on the outer surface 20*a* of the TFT substrate assembly 20A along the regions where the seals 40 are disposed, and the second scribe-formation step S8 of forming, after the second thinning step S7, the second scribe grooves 30*b* on the outer surface 30*a* of the CF substrate assembly 30A along the regions where the seals 40 are disposed.

To be specific, the first thinning step S5 is intended to thin each of the TFT substrate assembly 20A and the CF substrate assembly 30A until they have the target thickness T+α, that is, the order of the target thickness. The second thinning step S7 is intended to develop the first scribe grooves 20*b* formed on the TFT substrate assembly 20A until the portions of the seals 40 are exposed at the bottoms of the first scribe grooves 20*b*, to keep the distance corresponding to the exposed portion 40*a* of each seal 40 between the end portions 20*c* of the TFT substrate assembly 20A on both sides of each first scribe groove 20*b*, and to reduce or remove the tensile stress that is produced between the end portions 20*c* and the seals 40 that are in contact with the end portions 20*c*.

The reduction or removal of the tensile stress on the end portions 20*c* of the TFT substrate assembly 20A that are in contact with the seals 40 can reduce or remove the compression stress produced as reaction force to the tensile stress on the portions of the CF substrate assembly 30A where the second scribe grooves 30*b* are formed. Thus, in forming the second scribe grooves 30*b*, the depths of the second scribe grooves 30*b* (the amounts of penetration into the substrate) can be made larger than those of conventional scribe grooves.

This configuration can eliminate the conventional need that the panel assembly 10A is forced to be divided by applying an external force such as bending stress. Thus, the panel assembly 10A can be divided with precision so that the liquid crystal display panels 10 after the division have predetermined outside dimensions. The method for producing liquid crystal display panels of the present invention allows the scribe grooves 20*b* and 30*b* to be formed favorably at the regions where the seals 40 are disposed, which therefore allows contribution to thin profiles and narrow frame regions of the liquid crystal display panels 10.

In this case, if in the first scribe-formation step S6, the first scribe grooves 20*b* are formed to reach the seals 40 disposed on a surface of the TFT substrate assembly 20A that is opposite to the outer surface 20*a*, the etching liquid 71, if used in the etching, soaks deeply into the first scribe grooves 20b with ease. Thus, portions of the seals 40 can be exposed with ease, whereby distances corresponding to the exposed portions 40a of the seals 40 can be easily kept between the end portions 20c of the TFT substrate assembly 20A on both sides of the first scribe grooves 20b.

In addition, if in the second scribe-formation step S8, the second scribe grooves 30b are formed to reach the seals 40 disposed on a surface of the CF substrate assembly 30A that is opposite to the outer surface, the panel assembly 10A is easily divided into the plurality of liquid crystal display panels 10 having the predetermined outside dimensions.

The foregoing description of the preferred embodiment of the method for producing liquid crystal display panels of the present invention has been presented for purposes of illustration and description with reference to the drawings. However, it is not intended to limit the present invention to the embodiment, and modifications and variations are possible as long as they do not deviate from the principles of the present invention.

Described in the above-described embodiment is the configuration of first forming the first scribe grooves 20b on the TFT substrate assembly 20A; however, the present invention is not limited thereto. For example, the same action and effect can be obtained by a configuration of first forming the scribe grooves 30b on the CF substrate assembly 30A to develop them to reach the seals 40 by etching to expose portions of the seals 40, whereby tensile stress is reduced, and then forming the first scribe grooves 20b on the TFT substrate assembly 20A.

In addition, described in the above-described embodiment is the configuration of forming the seals 40 on the CF substrate assembly 30A and attaching the CF substrate assembly 30A to the TFT substrate assembly 20A to prepare the panel assembly 10A; however, the present invention is not limited thereto. For example, the same action and effect can be obtained by a configuration of forming the seals 40 on the TFT substrate assembly 20A and attaching the TFT substrate assembly 20A to the CF substrate assembly 30A, or a configuration of forming the seals 40 on each of the TFT substrate assembly 20A and the CF substrate assembly 30A and attaching the TFT substrate assembly 20A to the CF substrate assembly 30A.

In addition, described in the above-described embodiment is the configuration of dividing (cutting) the panel assembly 10A along the lines for division (lines for cutting) indicated with the dashed-dotted lines in FIG. 2; however, the present invention is not limited thereto. It is essential only that the division (cutting) is performed on the panel assembly 10A at a given region corresponding to at least one of four sides of each seal 40 that is formed to have a shape corresponding to four sides of a square shape by using the method for producing liquid crystal display panels of the present invention.

The invention claimed is:

1. A method for producing a plurality of liquid crystal display panels from a panel assembly, the liquid crystal display panels having a panel thickness smaller than that of the panel assembly, the panel assembly being prepared by attaching a first substrate assembly having a plurality of display regions to a second substrate assembly having a plurality of display regions with seals sandwiched between the first and second substrate assemblies so as to surround the opposed display regions of the first and second substrate assemblies, the method comprising:
    a first thinning step of thinning each of the first substrate assembly and the second substrate assembly by etching the panel assembly;
    a first scribe-formation step of forming, after the first thinning step, first scribe grooves on an outer surface of the first substrate assembly along regions where the seals are disposed;
    a second thinning step of further thinning, after the first scribe-formation step, each of the first substrate assembly and the second substrate assembly by etching the panel assembly, and developing the first scribe grooves formed on the outer surface of the first substrate assembly to expose portions of the seals at bottoms of the first scribe grooves; and
    a second scribe-formation step of forming, after the second thinning step, second scribe grooves on an outer surface of the second substrate assembly along the regions where the seals are disposed.

2. The method according to claim 1, wherein in the first scribe-formation step, the first scribe grooves are formed to reach the seals disposed on a surface of the first substrate assembly that is opposite to the outer surface.

3. The method according to claim 1, wherein in the second scribe-formation step, the second scribe grooves are formed to reach the seals disposed on a surface of the second substrate assembly that is opposite to the outer surface.

4. The method according to claim 1, wherein in the first thinning step and in the second thinning step, the etching is performed while the panel assembly is soaked in an etching liquid.

5. The method according to claim 1, wherein in the first scribe-formation step and in the second scribe-formation step, the first scribe grooves and the second scribe grooves are formed with the use of a wheel including a rotary blade.

6. The method according to claim 1, the method further comprising,
    a step of preparing the panel assembly by forming, before the first thinning step, the seals so as to surround the display regions on the first substrate assembly or the display regions on the second substrate assembly, and dispensing liquid crystals in the regions surrounded by the seals to attach the first substrate assembly and the second substrate assembly to each other.

7. The method according to claim 1, wherein the seals are formed to have a shape corresponding to four sides of a square shape, and in the first scribe-formation step and in the second scribe-formation step, the first scribe grooves and the second scribe grooves are formed to correspond to at least one of the four sides of each seal.

* * * * *